3,406,219
PROCESS FOR THE DEHYDROGENATION OF ETHYL BENZENE

Danford H. Olson, Wood River, Ill., assignor to Marathon Oil Company, Findlay, Ohio, a corporation of Ohio
No Drawing. Filed Aug. 1, 1966, Ser. No. 569,048
8 Claims. (Cl. 260—669)

ABSTRACT OF THE DISCLOSURE

The present invention comprises a process for the production of styrene comprising in combination the steps of contacting ethyl benzene with at least 3 moles of carbon dioxide per mole of ethyl benzene in the presence of a catalytic amount of a catalyst consisting essentially of a Fischer-Tropsch catalyst and simultaneously causing the carbon dioxide to react with hydrogen to produce water and carbon monoxide during the course of the dehydrogenation process.

---

The present invention relates to new methods for the dehydrogenation of ethyl benzene and in preferred embodiments relates to new methods for the oxidative dehydrogenation of ethyl benzene to produce styrene.

Presently used methods for dehydrogenation of ethyl benzene to styrene suffer the disadvantage of relatively low conversions of the feed hydrocarbon per pass. To obtain conversions of even as high as 40%, it is necessary to dilute the hydrocarbon stream by adding more than two pounds of steam for every pound of hydrocarbon fed. At the high temperatures required for dehydrogenation, the heating requirements for converting water to steam constitute a major part of the operating cost. Another major disadvantage of the low conversion is the high cost of separating styrene from ethyl benzene. The separation of styrene is expensive and a large amount of ethyl benzene must be recycled.

Oxidative dehydrogenation enjoys two advantages: it is not necessary to feed large quantities of steam or other diluent to dilute the hydrocarbon, higher conversions to styrene are possible, thus reducing the cost of the separating equipment and the amount of ethyl benzene which must be recycled.

Present processes for oxidative dehydrogenation (such as that reported in U.S. 3,205,280,) convert the hydrocarbon to a halogenated hydrocarbon, e.g. an alkyl iodide, which is then dehydrohalogenated to produce the desired double bond-containing compound. The oxygen used in such a system serves to convert the hydrogen halide, e.g. HI, back to the free halogen which reacts with hydrocarbon to produce more alkyl halide. This approach has the disadvantage of introducing new reactions into the overall dehydrogenation reaction adding to the complexity of operation and the difficulty of control.

Other disadvantages of oxidative dehydrogenation using oxygen are the necessity to operate outside the explosive limits of the gas mixture and the loss of part of the feed hydrocarbon by combustion. Also, the presence of elemental oxygen leads to formation of various oxygen-containing by-products which must be separated out and disposed of.

The aforementioned disadvantages of conventional oxidative dehydrogenation processes are reduced or eliminated by the present invention. The invention utilizes the conjoint presence of Fischer-Tropsch catalysts with carbon dioxide. The carbon dioxide not only acts as the diluting gas, but also reacts with hydrogen to produce water and carbon monoxide thus apparently shifting the equilibrium and eliminating the equilibrium conversion barrier encountered by conventional dehydrogenation processes.

As used herein "Fischer-Tropsch catalysts" is meant to include those metal oxides which are known to promote the reaction of hydrogen with CO and $CO_2$ by the well known Fischer-Tropsch reaction. The most preferred metal oxides are nickel oxide and iron oxide. It should be noted that conventional dehydrogenation catalysts are not all operable with the present invention.

The hydrocarbon feed materials for use with the present invention are alkyl benzenes which have from two to about six and more preferably from two to about three carbon atoms in their single alkyl group. Ethyl benzene is most preferred.

The present reaction is preferably run in the vapor phase at a temperature of from about 300 to 800° C., more preferably from 400 to 700° C., and most preferably from 500 to about 600° C. Temperatures outside these ranges may in some cases, be utilized and it will generally be necessary to select temperature ranges which do not decompose the products or reactants of the present invention. Combustion of products or reactants will normally pose no problem whatsoever in sharp contrast to the oxidative dehydrogenations carried out by conventional techniques.

Pressure is not narrowly critical, but should be from about 0.1 to 10,000 atmospheres, more preferably from 0.5 to about 5 atmospheres, and most preferably from 0.8 to about 1.2 atmospheres, all pressures being absolute.

For practical yields it is necessary to have not less than 3, and preferably from about 5 to about 20 moles of carbon dioxide present in the reaction zone for each mole of hydrocarbon present in the reaction zone. Lower ratios generally result in excessive decomposition of starting material.

The catalysts of the present invention can be prepared by the utilization of any of a wide variety of conventional techniques including the deposition of the catalysts on conventional catalyst support materials, e.g. alumina, silica, molecular sieves, and natural synthetic zeolites, preferably those having low acidity. Alternatively, the catalysts may be employed without auxiliary support materials.

With or without supports, the catalysts may be utilized as round pellets, as rings, or in other shapes which may be particularly well suited to the reaction apparatus and conditions to be employed. The catalysts may be packed in a porous bed or may be utilized as a fluidized bed. While batch reactions may be employed under certain special circumstances, the present inventioin will, in most cases, be conducted on a continuous basis.

While the invention is not to be taken as being dependent on any particular reaction mechanism or theory of operation, Example I indicates that there is an actual oxidative dehydrogenation involved in the process with carbon dioxide forming carbon monoxide and water by reaction with hydrogen. As mentioned above, this reaction of carbon dioxide apparently shifts the equilibrium and promotes the dehydrogenation. The reaction of the present invention should be distinguished from previous processes which have utilized other catalysts, or have in some instances, utilized carbon dioxide as a mere diluent gas, inert under the reaction conditions and not capable of shifting the reaction equilibrium, or have not taught the critical $CO_2$ levels taught herein.

The reaction is subject to a wide variety of other modifications and variations which will be apparent to those skilled in the art upon a reading of the specification and it should be understood that the claims appended hereto are to be taken as including all of those apparent modifications and variations.

Example I

A 316 stainless steel tubular reactor (15 inches length x ⅝ inches I.D.) is packed with 105 grams of unsupported Girdler G–64 primarily iron oxide dehydrogenation catalyst manufactured by the Girdler Company of Louisville, Ky. Ethyl benzene vapor at 150 cc. per minute and carbon dioxide at 900 cc. per minute (both measured at 1 atmosphere and 25° C.) are passed over a bed packed with the ¼ inch diameter pellets of the catalyst at a temperature of approximately 609° C. The average residence time in the reactor is approximately 1.06 seconds and the catalyst nearly fills the reaction chamber. A Dry Ice/acetone cold trap at −80° C. condenses the liquid product. Analysis indicates that this product contains 38.8% by weight of styrene, 1.5% toluene and 0.7% benzene. The liquid recovered amounts to 98% of the ethyl benzene fed. The recovered gas contains 92.0% carbon dioxide, 5.5% carbon monoxide and 2.3% hydrogen, all by volume. Based on the styrene formed, 68.5 mole percent of the hydrogen produced is converted to water, the hydrogen converted to water was equivalent to the amount of carbon monoxide produced, thus demonstrating the apparent oxidative dehydrogenation of the present invention.

Example II

When a conventional oxidative dehydrogenation is run, using air instead of carbon dioxide, and following the procedure of Example I, analysis of the recovered gas shows only 12.8% of hydrogen converted to water. Of the oxygen fed, 80.6% is accounted for as carbon monoxide and carbon dioxide which is equivalent to 6.3% combustion of the ethyl benzene. This demonstrates that the catalyst alone is not capable of producing the valuable results of the present invention and that the combination of the Fischer-Tropsch catalyst with carbon dioxide is necessary. While the conversions utilizing air are high, the overall efficiency of the reaction is lowered by the combustion of a significant portion of the feed materials.

Example III

When isopropyl benzene vapor and carbon dioxide are utilized according to the procedures and in the amounts of Example I, alpha methyl styrene is produced in good conversion with no detectable combustion. The product was contamniated with styrene.

Example IV

When ethyl benzene and carbon dioxide are reacted according to the procedures and in the amounts of Example I, substituting a nickel oxide catalyst for the iron oxide catalyst utilized in Example I, styrene is produced in high selectivity and no detectable combustion occurs.

What is claimed is:

1. A process for the production of styrene comprising in combination the steps of contacting ethyl benzene with at least 3 moles of carbon dioxide per mole of ethyl benzene in the presence of a catalytic amount of a catalyst consisting essentially of a Fischer-Tropsch catalyst and simultaneously causing the carbon dioxide to react with hydrogen to prdouce water and carbon monoxide during the course of the dehydrogenation process.

2. The process of claim 1 wherein the catalyst comprises a major portion of iron oxide.

3. The process of claim 1 wherein the catalyst comprises a major amount of nickel oxide.

4. The process of claim 2 wherein the ethyl benzene and carbon dioxide are contacted in the vapor phase at a temperature of from about 300 to about 800° C.

5. The process of claim 3 wherein the ethyl benzene and carbon dioxide are contacted in the vapor phase at a temperature of from about 300 to about 800° C.

6. The process of claim 4 wherein styrene is recovered from the product stream.

7. The process of claim 5 wherein styrene is recovered from the product stream.

8. The process of claim 1 wherein from 5 to about 25 moles of carbon dioxide are present for each mole of ethyl benzene.

References Cited
UNITED STATES PATENTS

| | | | |
|---|---|---|---|
| 1,541,175 | 6/1925 | Ostromislensky et al. | 260—669 |
| 1,541,175 | 6/1925 | Ostromislensky et al. | 260—669 |
| 3,093,694 | 6/1963 | Soderquist et al. | 260—669 |

DELBERT E. GANTZ, *Primary Examiner.*

C. R. DAVIS, *Assistant Examiner.*